(12) United States Patent
Campbell et al.

(10) Patent No.: US 8,140,837 B2
(45) Date of Patent: Mar. 20, 2012

(54) AUTOMATICALLY MAKING SELECTIVE CHANGES TO FIRMWARE OR CONFIGURATION SETTINGS

(75) Inventors: Keith M. Campbell, Cary, NC (US); William G. Pagan, Durham, NC (US); Marc V. Stracuzza, Durham, NC (US); Michael N. Womack, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 12/265,018

(22) Filed: Nov. 5, 2008

(65) Prior Publication Data

US 2010/0115252 A1    May 6, 2010

(51) Int. Cl.
- G06F 9/00 (2006.01)
- G06F 15/177 (2006.01)
- G06F 11/00 (2006.01)

(52) U.S. Cl. ............................................. 713/1; 726/22
(58) Field of Classification Search ........................ 713/1
See application file for complete search history.

(56) References Cited

U.S. PATENT DOCUMENTS

| | | | |
|---|---|---|---|
| 5,522,076 A * | 5/1996 | Dewa et al. ...................... | 713/2 |
| 6,170,055 B1 | 1/2001 | Meyer et al. | |
| 6,317,845 B1 | 11/2001 | Meyer et al. | |
| 7,043,664 B1 * | 5/2006 | Chiloyan ...................... | 714/5.11 |
| 7,272,706 B2 * | 9/2007 | Ben Ismail et al. ................ | 713/1 |
| 7,870,394 B2 * | 1/2011 | Repasi et al. .................. | 713/188 |
| 2004/0076043 A1 | 4/2004 | Boals et al. | |
| 2006/0253620 A1 | 11/2006 | Kang | |
| 2007/0005871 A1 | 1/2007 | Zimmer et al. | |

FOREIGN PATENT DOCUMENTS

| | | |
|---|---|---|
| EP | 0917060 A1 | 6/1999 |
| EP | 1310908 A2 | 5/2003 |
| JP | 2001522088 A | 11/2001 |
| JP | 2002176456 | 6/2002 |
| JP | 2004145886 | 5/2004 |
| JP | 2005182418 | 7/2005 |
| JP | 2005228004 A | 8/2005 |
| JP | 2006106914 | 4/2006 |
| JP | 2008003861 | 1/2008 |
| WO | WO9923561 | 5/1999 |
| WO | WO 9941620 A2 * | 8/1999 |

OTHER PUBLICATIONS espacenet "Bibliographic data: JP 2005228004(A)—Computer Remote Diagnosis and Restoration System, Server, Program, and Method", http://worldwide.espacenet.com/publicationDetails/biblio?DB=EPODOC&adjacent=true&..., May 27, 2011, 1 page.
Hiratsuka, Yukio "Information Processor, Program Update Processing Method and Rewriting Control Software", JP2008003861 Publ. Jan. 10, 2008. English version data sheet.

(Continued)

*Primary Examiner* — Suresh Suryawanshi
(74) *Attorney, Agent, or Firm* — Cynthia G. Seal; Jeffrey L. Streets

(57) ABSTRACT

According to one embodiment, a corrupted network hardware device may be automatically inspected and repaired. A default boot sequence may be suspended, and an external recovery device may inspect and repair the corrupted code by selectively repairing files and configuration settings in a minimally invasive manner, to preserve as many user settings as practicable. The network hardware device may then be re-booted from the repaired firmware.

20 Claims, 2 Drawing Sheets

OTHER PUBLICATIONS

Fukumoto, Akihiro "Electronic Device and Information Update Method", JP2002176456 Publ. Jun. 21, 2002. English version data sheet.

Takamasa, Yoshiyuki "Firmware-Operated Processing Device and Firmware-Updating Method", JP2006106914 Publ. Apr. 20, 2006. English version data sheet.

Boals, Daniel A. "Reliable and Secure Updating and Recovery of Firmware From Mass Storage Device", JP2004145886 Publ. May 20, 2004. English version data sheet.

Nishioka, Naoki "Image-Forming Apparatus", JP2005182418 Publ. Jul. 7, 2005. English version data sheet.

* cited by examiner

AUTOMATICALLY MAKING SELECTIVE CHANGES TO FIRMWARE OR CONFIGURATION SETTINGS

BACKGROUND OF THE INVENTION

1. Field of the Invention

The present invention relates to the detection and recovery of corrupted firmware on an electronic device.

2. Background of the Related Art

Many electronic devices are controlled by electronically updatable firmware. Such devices are subject to potential disruption caused by a corrupted flash image. A corrupted flash image may result, for example, from an improper flash update of the firmware. Networked devices are especially prone to having a corrupted flash image due to their distributed presence on a network. For example, the firmware of a management module for a blade server chassis may be corrupted when certain files on the management module get filled with invalid configurations. As a result, the management module may get trapped in a reboot or software loop which does not allow the user to gain access to the module. In this situation, the management module can become unusable and the user cannot reload the management module with a known good image of the embedded software.

BRIEF SUMMARY OF THE INVENTION

One embodiment of the present invention provides a method of recovering an improperly programmed embedded device. One or both of firmware used to operate the hardware device and configuration settings used by the firmware in operating the hardware device are electronically inspected. Errors in the firmware or the configuration settings that would cause improper operation of the hardware device are identified. Selected changes are automatically made to one or both of the firmware and configuration settings to correct the identified errors without overwriting all of the firmware or all of the configuration settings. The method may be performed, for example, by a computer executing computer usable program code for recovering the improperly programmed hardware device, wherein the computer usable program code is embodied on a computer usable medium.

Another embodiment provides a system that includes a hardware device and an external recovery device. The hardware device includes an internal storage device having electronically updatable firmware and configuration settings accessible by the firmware in operating the hardware device, an internal data communication port for interfacing with the internal storage device, and an external data communication port. The external recovery device is configured for selectively connecting with the external data communication port on the hardware device. The external recovery device includes flash memory having functional correction code configured for inspecting and selectively repairing the firmware and configuration settings.

DETAILED DESCRIPTION OF THE INVENTION

The present invention may be embodied as systems, methods, and software for automatically recovering firmware on a network hardware device, such as a management module in a multi-server chassis. In one embodiment, an external recovery device or "repair key" will be plugged into the network hardware device to inspect and repair corrupted firmware on the network hardware device. A repair program containing program code running off the repair key will mount an internal storage device on which the firmware is stored. The repair program will go through selected files on the internal storage device to ascertain the structure and contents of the selected files. The repair program will analyze the keys and data in the file and determine if there are any conflicting settings that may cause improper operation with the current level of firmware loaded on the hardware device. The repair program will also surgically analyze and inspect the contents of the firmware to make the minimum amount of changes need for the hardware device to function properly after repair. This approach may keep as many of the user's settings as practicable, improve the perceived quality of the repair action, and decrease the time required to restore the system to a fully operational condition.

Figure 1:
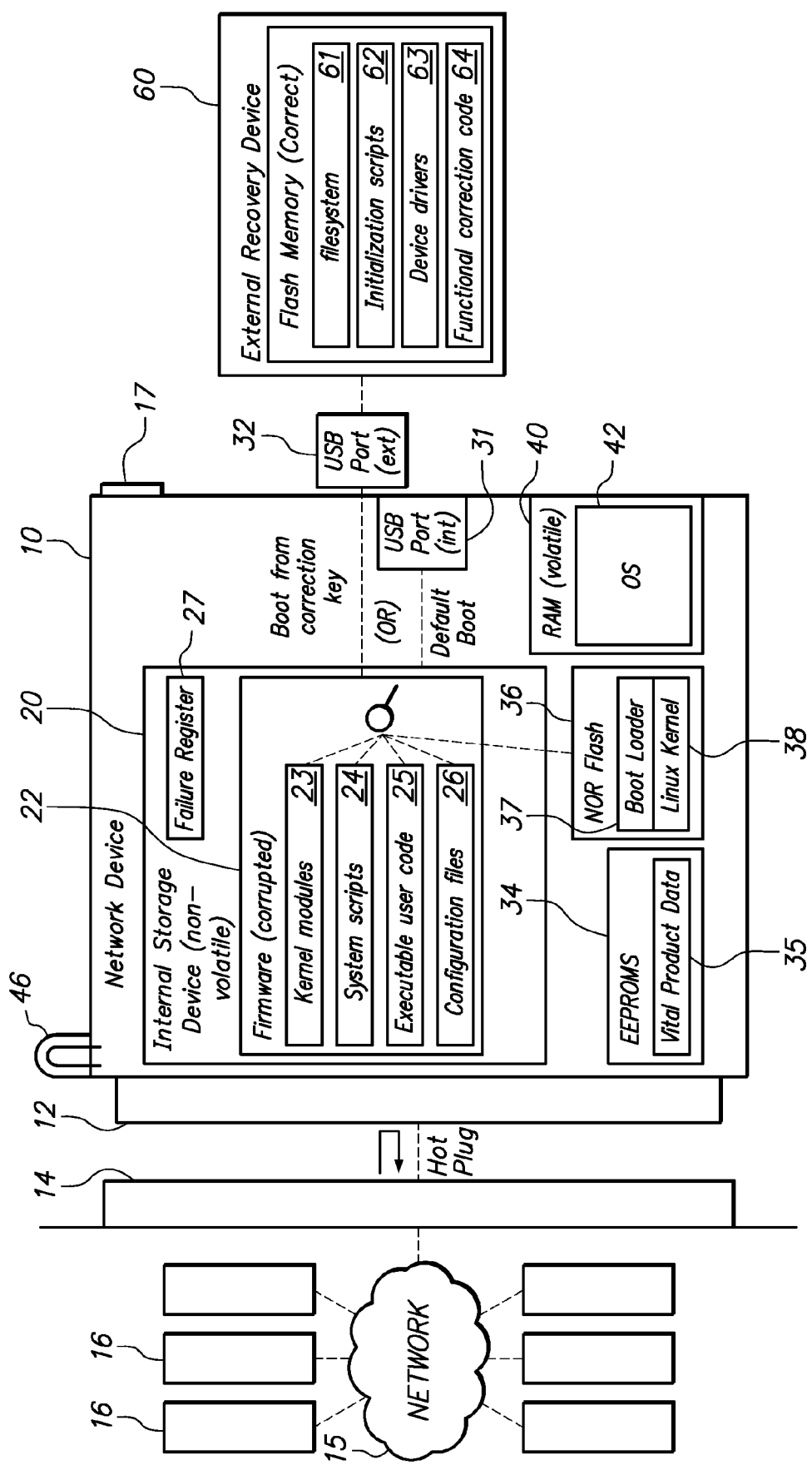
FIG. 1 is a block diagram of a network hardware device and a removable external recovery device for recovering the network hardware device from a corrupted state according to an embodiment of the invention.

FIG. 1 is a block diagram of a network hardware device 10 that selectively interfaces with a network 15, and a removable external recovery device 60 for recovering corrupted program code on the network hardware device 10 according to an embodiment of the invention. The network hardware device 10 interfaces with the network 15 as a node, identifiable and accessible on the network 15 by a unique IP address. The network hardware device 10 includes a power and I/O (input/output) connector 12 that releasably connects to a mating connector 14 for interfacing with a network 15. The connector 12 and mating connector 14 may be any of a variety of standardized or proprietary connector types. For example, the network hardware device 10 may be embodied as an electronic card, in which case the connector 12 may be a card edge having a plurality of I/O pins, and the mating connector 14 may be a socket (female) having a corresponding plurality of I/O pins. The mating connector 14 may be disposed, for example, on a midplane of a multi-server chassis. The network hardware device 10 communicates with other networked devices 16 over a network 15. The network hardware device 10 receives power and network connectivity when the network hardware device connector 12 is connected to the mating connector 14, and optionally as powered on with an optional power switch 17.

The network hardware device 10 may be embodied as any of a variety of electronic computer hardware controlled by electronically-updatable program code such as firmware 22 provided on non-volatile memory of an internal storage device 20. The firmware 22 includes software elements such as, but not limited to, kernel modules 23, system scripts 24, executable user code 25, and configuration files 26. In contrast with software that may be run on a general-purpose computer, the firmware 22 is typically specifically tailored to the intended functions of the network hardware device 10. Thus, in some instantiations, the network hardware device 10 may be classified as an "embedded device," having a predefined functionality governed by the firmware 22. One possible instantiation of the network hardware device 10, for example, is a hot-swappable management module for managing the other networked devices 16, such as blade servers and support modules in a multi-server chassis. In that context, the firmware 22 may include software elements whose functions are specifically tailored to managing the blade servers and support modules. This management functionality may include interfacing with the blade servers to monitor performance and activity, control power settings of the blade servers and generally manage power to the blade-server chassis, and receive and process alerts from the various blade servers and support modules.

The internal storage device 20 may contain flash memory, which can be electrically erased and reprogrammed for many cycles (e.g. thousands of cycles) in its useful service life. The internal storage device 20 may be embodied, for example, as an internal "flash drive," or in one instantiation as a "micro disk on chip," which is a rugged drive containing optional wear-leveling technology for extending the useful service life (i.e. increasing the number of read/write cycles). Because flash memory is non-volatile, no power is required to maintain the information stored on it. Additionally, flash memory offers fast access (read or write) times and is generally more durable and shock-resistant than a "hard-disk," which stores memory on a rotating magnetic platter.

The network hardware device 10 also includes one or more EEPROMs (Electrically Erasable Programmable Read-Only Memory) 34, NOR flash 36, and RAM 40. EEPROMs are non-volatile memory used in computers and other electronic devices to store small amounts of data that must be saved when power is removed. Here, the EEPROMs 34 are used to store Vital Product Data 35, which is a collection of configuration and informational data associated with a particular set of hardware or software. For example, the Vital Product Data may include part numbers, serial numbers, and engineering change levels for the network hardware device 10. The NOR flash 36 is a type of flash memory known in the art that has traditionally been used to store relatively small amounts of executable code in embedded devices. Here, the NOR flash 36 is used to store a boot loader 37 and Linux kernel 38 (collectively referred to as the "bring up code"). The RAM (random access memory) 40 is volatile memory used as temporary storage for code used in the execution of the duties of the network hardware device 10. In particular, the RAM 40 is used to store elements of the network hardware device's operating system (OS) 42. The network hardware device 10 may also include numerous connectivity ports, including at least one internal data communication port (in this example, an internal USB port 31) and at least one external data communication port (in this example, an external USB port 32). The various components of the network hardware device 10 may communicate with each other over a bus (not shown).

When initialized, the network hardware device 10 will begin to boot from the bring-up code that includes the boot loader 37 and Linux kernel 38 stored in non-volatile memory on the NOR flash 36. The Linux kernel 38 is the central component of the operating system 40, and its responsibilities will typically include managing system resources, including the communication between hardware and software components. Execution of the boot loader 37 starts a series of events which, in a default boot sequence, will culminate with the internal storage device 20 being mounted to load the operating system 42 into RAM 40. Typically, the internal storage device 20 will already be physically connected to the internal USB port 31 when the network hardware device 10 is initialized, such that "mounting" the internal storage device 20 may involve electronically switching from the NOR flash 36 to the internal storage device 20. Upon mounting the internal USB port 31, the network hardware device 10 continues to load the kernel modules 23 and run the system scripts 24 and executable user code 25 from the internal storage device 20 to fully load the operating system 42.

The external recovery device 60, which may be alternatively referred to as the "repair key," may be embodied as a USB flash memory device configured for removably connecting to the external USB port 32. When connected to the external USB port 32, the external recovery device 60 interrupts the default startup sequence prior to mounting the internal storage device 20. Instead of mounting the internal storage device 20, the network hardware device 10 mounts the external recovery device 60, which checks for and correct any errors on the network hardware device 10. "Mounting" the external recovery device 60 may involve the user physically coupling the external recovery device 60 to the external USB port 32, but may also include electronically switching to the external recovery device 60. The filesystem 61 and initialization scripts 62 on the external recovery device 60 load the device drivers 63 to be able to communicate with the internal storage device 20, the EEPROMs 34, and/or the NOR Flash 36. The initialization scripts 62 on the external recovery device 60 will automatically run. The functional correction code 64 checks to determine whether there are any problems with data and program code on the internal storage device 20, the EEPROMs 34, or the NOR flash 36. The functional correction code 64 examines the program code on the network hardware device 10, such as the firmware 22, kernel modules 23, scripts 24, and executable user code 25.

If the external recovery device 60 detects abnormalities in the program code on the network hardware device 10, such as firmware 22 or on code and settings stored in the EEPROMs 34 or NOR flash 36, or if previous boot failures have been recorded on a failure register 27, a series of inspection and repair actions can be performed by the external recovery device 60. One example of an inspection and repair action is to analyze certain critical files on the internal storage device 20 and update these critical files as necessary. The critical files to be analyzed could be, for example, "configuration" files, such as files pertaining to a datastore of configuration selections. Another example of an inspection and repair action is to examine the NOR flash 36 and modify the contents of the NOR flash 36 for use on a subsequent boot. Another example of an inspection and repair action is to install new files in certain directories of the internal storage device 20. For example, new files could be installed in library directories or system configuration directories included in the system path for use by new or existing processes.

The functional correction code 64 can examine the contents of the configuration files 26 in the firmware 22 and look for conflicting settings or settings that may cause issues with previous levels or versions of the firmware 20. Such conflicts may be identified using rules learned from previous firmware behavior and the settings read from the configuration files 26. For instance, small, functional tests can be run out of the executable correction code. Settings may be tried to test direct communication with particular components. Selected settings could be modified and re-test to verify the conflicts are resolved. One implementation may involve running a Built-In Self Test (BIST) or ongoing diagnostic. The diagnostic could include, for example, algorithms for computing checksums, polling devices, inspecting file contents, and so forth.

A specialized and programmatic method may be used according to an embodiment of the invention to examine critical files that exist in the file structure of the firmware 22 and selectively repair the data inside the files. Rather than simply overwriting the entire contents of the firmware 22 or the configuration files 26, the functional correction code 64 on the external recovery device 60 intelligently inspects the contents of the files in the firmware 22 and identifies appropriate structure and content of the firmware 22 and/or the settings and how the settings will interact with the firmware 22. The files may be "parsed" to check for any erroneous or conflicting settings that could cause abnormal operation. In this way the functional correction code 64 on the external recovery device 60 is executing in a unique way to verify that the files in the firmware 22 contain data that will allow the network hardware device 10 to function properly on a subsequent boot.

In some instances, there may be no file system errors in the program code on the internal storage device 20, but the data in the files may, itself, have bad or inappropriate settings that can cause the network hardware device 10 to become inaccessible through the external network 15 or other means. This correction process will work to preserve as much of the settings as possible and seek out the problem settings and files and selectively correct them, in a surgical fashion, keeping as much of the user settings as possible, improving the perceived quality of the repair action, and decreasing the time required to make the system fully operational again.

To illustrate, in one hypothetical scenario, a failure of the network hardware device 10 to connect to the network may indicate the possibility of corrupted firmware. The failure could be logged in the failure register 27. The functional correction code 64 could be used to check the IP address setting of the network hardware device 10. The functional correction code 64 could also check firewall settings, including blocked ports and IP addresses. If the functional correction code 64 determines, for example, that a firewall is blocking the network hardware device's IP address from an external port, the functional correction code could open that IP address and port in the firewall, to restore functionality to the network hardware device 64. This is an efficient alternative to blindly restoring all of the configuration settings or replacing the entirety of the firmware with a known good image, and results in minimal changes to configuration settings.

After the intelligent file inspection and repair has been performed and the firmware 22 has been recovered by the external recovery device 60, a visual indication may be provided to the user, such as by illuminating an LED or other illuminating device 46. In response to the visual indication, the user may remove the external recovery device 60 from the external USB port 32. Then, the network hardware device 10 can be reset so that it may be re-booted from the recovered firmware 22. One way to reset the network hardware device 10 is by power-cycling the network hardware device 10. Power-cycling the hardware device may entail momentarily removing the network hardware device 10 from the network 15 and hot-plugging the network hardware device 10 with the network 15. The user may power-cycle the hardware device by physically disconnecting and reconnecting the connector 12 and the mating connector 14. For example, the user may remove pull a lever (not shown) to release the network hardware device 10 (which may be a management module) from the chassis, leave the management module disconnected from the chassis for a few moments, and then plug the management module back into the chassis/midplane. This approach of manually hot-plugging the network hardware device 10 is a convenient way to reset the network hardware device 10 because the user may already be physically present at the chassis to remove the external recovery device 60 from the network hardware device 10.

Figure 2:
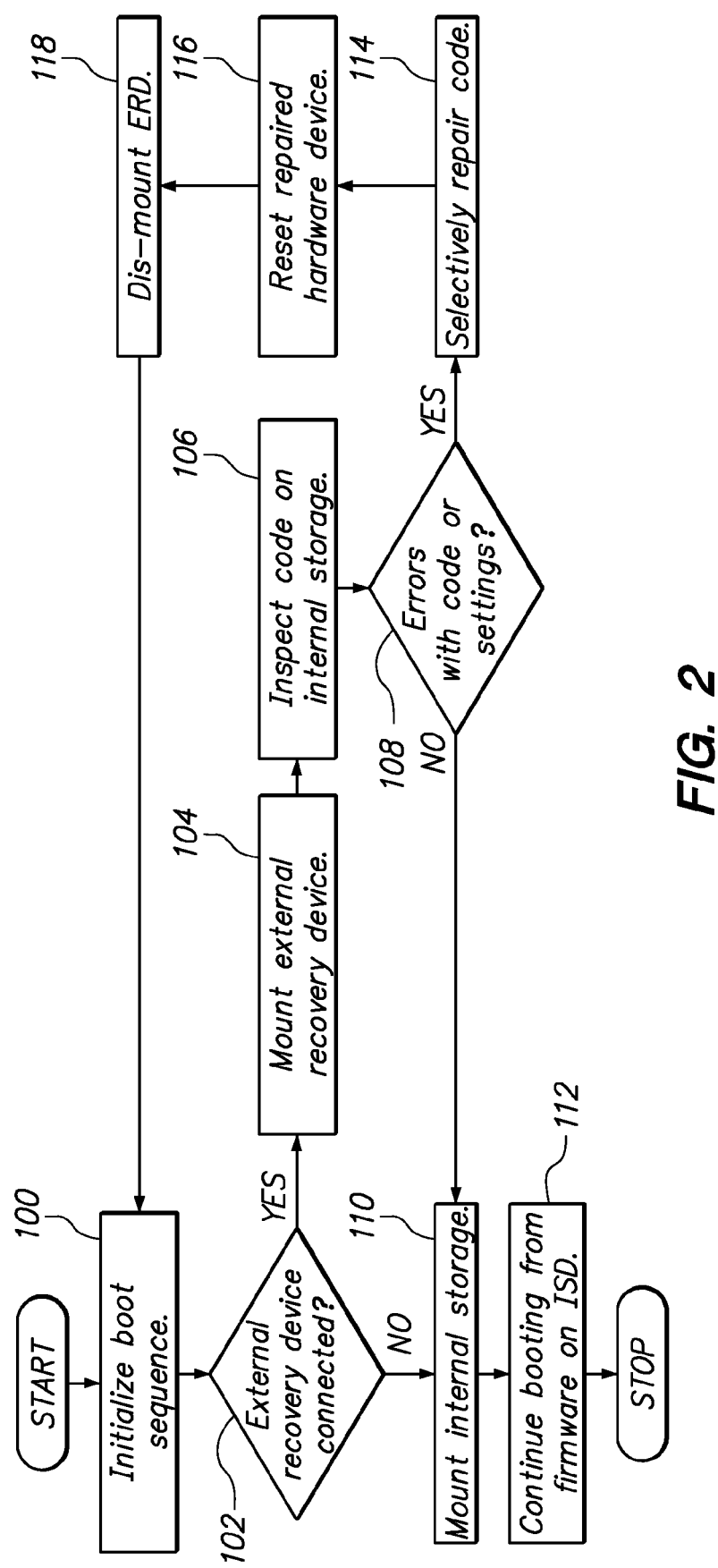
FIG. 2 is a flowchart outlining a method of automatically detecting and repairing a potentially corrupted hardware device according to an embodiment of the invention.

FIG. 2 is a flowchart outlining a method of automatically detecting and repairing a potentially corrupted hardware device according to an embodiment of the invention. The corrupted hardware device may be a network-connected device, such as a management module, operated by application-specific firmware. For example, the method may be implemented by an algorithm executed by the external recovery device 60 on the network hardware device 10 of FIG. 1. Thus, the following description of the flowchart of FIG. 2 may be further informed by reference to FIG. 1 and the description of FIG. 1.

A default boot sequence is initialized in step 100. When initialized, the hardware device will begin to boot from bring-up code, such as a boot loader and kernel stored in non-volatile memory on the hardware device. Execution of the boot loader starts the series of events that, in the default boot sequence, will culminate with loading an operating system. Conditional step 102 involves determining whether an external recovery device is connected. If connected, the external recovery device is mounted in step 104 and the default boot sequence is temporarily suspended. The external recovery device may load a kernel with device drivers to be able to communicate with the internal storage device to inspect code in step 106. The code to be inspected may include firmware used to operate the hardware device. The firmware may include kernel modules, system scripts, executable user code, and configuration files an on internal storage of the hardware device. Any code errors, including damaged files or bad configuration settings, are identified in conditional step 108. Any code errors may be determined by identifying a deviation from an expected file structure, contents, or configuration settings. The external recovery device may assess the configuration settings and how they will interact with other code included with the firmware on the hardware device. The code may be "parsed" to check for any erroneous or conflicting settings that could cause abnormal operation. This process will verify that the files in the firmware contain data that will allow the network hardware device to function properly on a subsequent boot. If no errors are detected, the internal storage may be mounted in step 110 and the hardware device may continue to boot in step 112 from the kernel modules, system scripts, executable user code, and configuration stored on the internal storage.

Alternatively, if errors are detected in conditional step 108, the code may be selectively repaired in step 114. The recovery algorithm may begin with a basic file system check using, for example, e2fsck. Configuration files and software may then be checked for compatibility and/or validity, and corrected as needed. An example of a bad configuration would be a configuration parameter inside a configuration file which on a prior load was acceptable, but with a firmware update causes the system to become unstable. Next, configuration parameters may be fixed, if possible. Alternatively, if any of files are beyond repair or are not correctable, then those files may be replaced with default or known working configuration files from installed external recover device. After the selective code repair in step 114, the repaired hardware device is reset in step 116 and the external recover device may be dismounted in step 118. Then, the repaired hardware device may be re-booted to a known good load beginning with step 100.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may be communicated by a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of recovering an improperly programmed embedded device, comprising:
   electronically inspecting one or both of firmware used to operate the hardware device and configuration settings used by the firmware in operating the hardware device;
   identifying errors in the firmware or the configuration settings that would cause improper operation of the hardware device; and
   automatically making selective changes to one or both of the firmware and configuration settings to correct the identified errors without overwriting all of the firmware or all of the configuration settings.

2. The method of claim 1, further comprising:
   making only changes to the firmware or configuration settings that are essential to render the hardware device operable.

3. The method of claim 1, wherein the step of identifying errors in the firmware or the configuration settings comprises identifying any conflicting settings that may cause improper operation within the version of the firmware on the hardware device.

4. The method of claim 1, further comprising:
   initiating a default boot sequence of the hardware device prior to electronically inspecting and identifying errors in the firmware and configuration settings; and
   re-booting the hardware device after making selective changes to one or both of the firmware and configuration settings to correct the identified errors.

5. The method of claim 1, further comprising:
   resetting the hardware device after making selective changes to correct the identified errors; and
   fully rebooting the hardware device using the after resetting the hardware device.

6. The method of claim 5, wherein the step of resetting the hardware device comprises one or both of power-cycling and hot-plugging the hardware device.

7. The method of claim 1, wherein the step of identifying errors in the firmware or the configuration settings comprises reading a record of prior boot failures.

8. The method of claim 1, wherein the step of identifying errors in the firmware or the configuration settings comprises:
   testing communication with selected components of the hardware device;
   modifying selected settings; and
   re-testing communication using the selected settings to verify restored communication with the selected components using the modified settings.

9. A computer program product including computer usable program code embodied on a non-transitory computer usable storage medium for recovering an improperly programmed hardware device, the computer program product including:
   computer usable program code for electronically inspecting one or both of firmware used to operate the hardware device and configuration settings used by the firmware in operating the hardware device;
   computer usable program code for identifying errors in the firmware or the configuration settings that would cause improper operation of the hardware device; and
   computer usable program code for selectively making changes to one or both of the firmware and configuration settings to correct the identified errors without overwriting all of the firmware or all of the configuration settings.

10. The computer program product of claim 9, further comprising computer usable program code for determining the minimum number of changes to the firmware or configuration settings to render the hardware device operable.

11. The computer program product of claim 9, wherein the computer usable program code for identifying errors in the firmware or the configuration settings comprises computer usable program code for identifying any conflicting settings that may cause improper operation within the version of the firmware on the hardware device.

12. The computer program product of claim 9, further comprising:
   computer usable program code for initiating a default boot sequence of the hardware device prior to electronically inspecting and identifying errors in the firmware and configuration settings; and
   computer usable program code for re-booting the hardware device after selectively making changes to one or both of the firmware and configuration settings to correct the identified errors.

13. The computer program product of claim 9, further comprising:
   computer usable program code for resetting the hardware device after selectively repairing the identified errors; and
   computer usable program code for fully rebooting the hardware device using the after resetting the hardware device.

14. The computer program product of claim 13, wherein the computer usable program code for resetting the hardware device comprises computer usable program code for one or both of power-cycling and hot-plugging the hardware device.

15. The computer program product of claim 9, wherein the computer usable program code for identifying errors in the firmware or the configuration settings comprises computer usable program code for electronically reading a record of prior boot failures.

16. The computer program product of claim 9, wherein the computer usable program code for identifying errors in the firmware or the configuration settings comprises:
   computer usable program code for testing communication with selected components of the hardware device;
   computer usable program code for modifying selected settings; and
   computer usable program code for re-testing communication using the selected settings to verify restored communication with the selected components using the modified settings.

17. A system, comprising:
   a hardware device including an internal storage device having electronically updatable firmware and configuration settings accessible by the firmware in operating the hardware device, an internal data communication port for interfacing with the internal storage device, and an external data communication port; and
   an external recovery device configured for selectively connecting with the external data communication port on the hardware device, the external recovery device including flash memory having functional correction code configured for inspecting and selectively repairing the firmware and configuration settings.

18. The system of claim 17, wherein the external recovery device is configured for interrupting a default boot sequence of the hardware device prior to inspecting and repairing the firmware and configuration settings, and re-booting the external recovery device from the repaired firmware and configuration settings.

19. The system of claim 17, wherein the hardware device comprises a management module of a server chassis.

20. The system of claim 17, wherein the external recovery device comprises a flash device configured for removably connecting to the hardware device.

* * * * *